Oct. 7, 1958  J. E. BAYHA  2,855,550
VARIABLE CAPACITORS
Filed Dec. 24, 1953

J. E. BAYHA
INVENTOR.

BY Darby & Darby
ATT'YS

United States Patent Office 2,855,550
Patented Oct. 7, 1958

2,855,550

VARIABLE CAPACITORS

Jack Elliott Bayha, South Ozone Park, N. Y., assignor to Emerson Radio and Phonograph Corporation, New York, N. Y., a corporation of New York Application December 24, 1953, Serial No. 400,263

8 Claims. (Cl. 317—249)

The present invention relates to the art including variable capacitors, and more particularly, to variable capacitors which can be made in miniature sizes and with uniform characteristics.

In the mass production of electric equipment, one of the important factors is the production of circuit components which will have small size and weight and which will be uniform in their electric characteristics. A particularly important component requiring these qualities is the variable capacitor, particularly for tuning purposes. In reducing the size of capacitors, one factor of assistance is the use of dielectric materials of substantial dielectric constant. The appearance of titanate and other compounds having dielectric constants ranging from 10 to 9,000 or more, has made possible considerable reduction in size of capacitors. However, in the case of variable capacitors, uniformity of characteristics has been very difficult if not impossible to achieve satisfactorily in mass production with close tolerances. Some of the more important required characteristics are achieving uniform desired effective capacitances over the whole range of variation; achieving desired slope of capacitance curve (i. e., variation of capacitance as a function of displacement of a control member); and to have reproducible retrack conditions (i. e., achieving the same capacitance at given position regardless of from which side that position is approached.

These problems are solved by the present invention which utilizes a sleeve or hollow cylinder of dielectric material, both as the dielectric for the capacitor itself and as the physical support for the capacitor. One element or "plate" of the capacitor is provided by a plated, printed or similarly deposited coating of conductive material on the outside of the dielectric cylinder. The other element or "plate" of the capacitor is provided by a conductive plunger structure within the dielectric cylinder whose depth of insertion within the conductive coating on the cylinder is variably adjustable to adjust the value of capacitance. For reduction in size of such capacitors, the dielectric cylinder should have a large value of dielectric constant K, such as between 10 and 1,000, depending upon the desired physical size, capacitance and operating frequency.

An important problem in capacitors of this type is that of maintaining uniform spacing between the outer conductive coating and the outer surface of the inner conductive plunger structure, since even minute variations in spacing between the coating and the plunger can cause an intolerable variation in capacitance, by inserting air dielectric of unity dielectric constant K and indeterminate dimensions in "series" with the high-K dielectric of the cylinder resulting in an indeterminate K. Ordinary sliding plungers are inadequate to overcome this disadvantage, due to the inherent though slight non-uniformity of dimensions in production. However, this problem is successfully overcome by the present invention, which makes use of conductive liquid such as mercury to make full and intimate contact with the inner surface of the dielectric cylinder.

Accordingly, it is an object of the present invention to provide improved miniaturized variable capacitors having uniformity of characteristics and adapted for mass production and automatic calibration.

Other advantages and features of the present invention will become more fully apparent from consideration of the following detailed description of preferred embodiments thereof, taken in conjunction with the appended drawing in which Figure 1 shows an axial, longitudinal cross-sectional view of a preferred form of the invention having axial symmetry;

Figure 1:
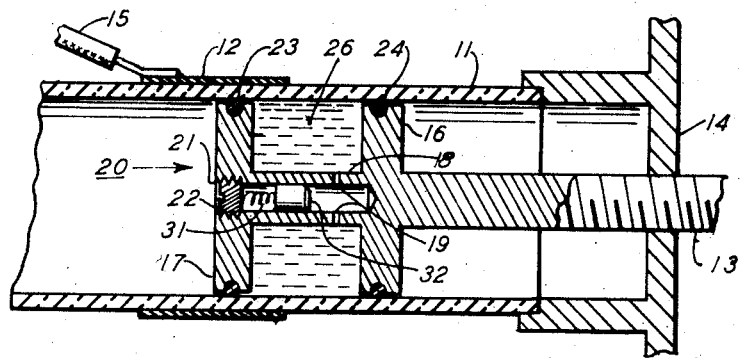

Referring to the drawing, Figure 1 shows a cylinder or tube 11 of dielectric material, preferably having a relatively high dielectric constant, such as between 10 and 1,000. This tube may be made of barium titanate or other titanate compounds or ceramic dielectrics of well known properties.

The material for dielectric cylinder 11 may have any dielectric constant value. In general, the higher values will provide smaller sizes, but will increase temperature sensitivity, so that the lowest value consistent with space requirements is preferably chosen.

Applied to the exterior of the dielectric tube 11 is a coating or layer 12 of conductive material, such as silver, aluminum, copper, or the like, in the form of a band or cylinder, and forming one element or "plate" of the variable capacitor of the present invention. A lead wire 15 may be secured to coating 12, as by soldering, clamping or other means. The other element or "plate" of the variable capacitor is provided by a conductive structure 20 slidably mounted within the dielectric tube 11 and under the actuation of a rod or shaft 13, which may for example be threaded into a fixed panel 14 supporting dielectric cylinder 11. Mounted for conjoint axial movement with shaft 13, as by being integral therewith or rotatably secured thereto, is a conductive end disc 16, which is connected to a similar conductive end disc 17 by a conductive hollow tube 18 having side apertures 19. Discs 16 and 17 may be integral with tube 18 as shown, or merely suitably joined thereto, if desired. Tube 18 communicates with a filler port 21 in end disc 17, which may be internally threaded for receiving a similarly threaded plug 22. The end discs 16 and 17 are provided with annular grooves around their periphery in which are seated respective sealing rings 23 and 24 of the type known as O rings, which may be made of rubber, neoprene, polytetrafluoroethylene ("Teflon") or other flexible material.

In assembly, after the parts are placed in their operative relationship, with the complete internal sliding structure 20 located within the dielectric cylinder 11, the filler plug 22 is removed and mercury 26 is inserted into the space bounded by the end discs 16, 17 and the cylinder 11, the filling being done through the filler port 21 and the internal tube 18, after which the plug 22 is replaced. This filling may be done in vacuum to assist in completely filling the enclosed space with mercury and in eliminating all air therefrom. The filler plug 22 is preferably formed of two portions 22, 32 separated by a compression spring 31, the portion 32 serving as a plunger within tube 18 to maintain the mercury 26 under slight pressure to assure complete filling of the dielectric cylinder 11. The mercury 26 therefore forms a metallic and conductive body internally of the dielectric tube 11 which completely fills the space within the cylinder 11 between rings 23 and 24, and provides full and intimate contact with the inner surface of cylinder 11. In this way the problem of air gaps or improper spacing between the external "plate" 12 and the internal "plate" formed by the mercury 26 is avoided and the internal electrode 26 is maintained in exactly the proper relationship with the external "plate" 12 as determined by the thickness of the dielectric tube 11, which can be accurately machined or formed to desired dimensions. Rotation of the shaft 13 then axially adjusts the mercury-bearing structure 20 so as to vary the relative area of capacitor "plates" in operative relationship.

End walls 16 and 17 and shaft 13 are preferably made of conductive material, either integrally as shown or by joined pieces, so that electrical connections may be simply made with respect to the electrode 26. For grounding purposes the panel 14 may be of conductive material coupled to the chassis; otherwise shaft 13 is insulated from the panel 14 and from ground by suitable well known means, and forms the second capacitor terminal.

If desired, end walls 16 and 17 may be made of nonconductive material, in which case conductive shaft 13 is conductively connected to the conductive tube 18, which in turn is in contact with the mercury 26 to provide the necessary lead-in. Any desired method of connection to the external electrode 12 may be utilized, as by a soldered lead, a clamped lead, an extension tab on the coating 12, or the like.

Figure 2:
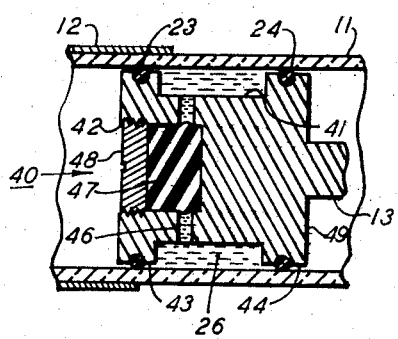
Figure 2 shows a similar view of a modified form of the invention.

Figure 2 shows a modified form of mercury plunger structure 20, in which a unitary plunger 40 is provided with an annular groove or cut-out 41 forming space for the mercury 26 to form a pair of annular leads 43, 44, carrying sealing rings 23, 24. Plunger 40 is also provided with an axial bore 42 extending from one end, having radial apertures 46 communicating with the space 41. A flexible plug 47 fills one end of bore 42, and is compressed by threaded plug 48, which causes plug 47 to extend into apertures 46 to place the mercury 26 under slight pressure, which assures that it fills the space within cylinder 11 between rings 23 and 24.

Where outer "plate" 12 is a true right circular cylinder, the unit just described will produce linear variation of capacitance with adjustment. In some instances, where very low minimum capacitances are desired, and where it is undesirable to have a movable terminal such as shaft 13, the coating 12 may be split into two separate nearly semicylinders parallel to one another, each with its own lead such as 15. Then these two leads form the capacitor terminals, both fixed in position, so that contact noise is avoided.

It will be understood that the present invention adapts itself immediately to gang tracking, since a plurality of conductive coatings such as 12 can be placed at spaced locations along the dielectric cylinder 11, and a like plurality of mercury electrode structures 20 can be coupled seriatum along shaft 13, with the same or different spacings within the dielectric tube 11, for simultaneous adjustment by means of a single control such as shaft 13, so as to obtain either ganged equal variable capacitances or ganged unequal capacitances, with specific capacitance curves, as desired.

Figure 3:
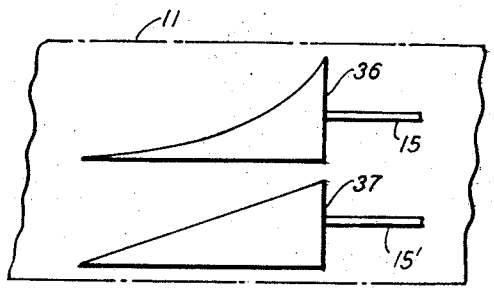
Figure 3 shows a flat developed view of the outer surface of the dielectric cylinder and outer coatings useful in the device of Figure 1 or of Figure 2.

Another and more compact form of ganging is illustrated in Fig. 3, wherein but a single plunger is required. Fig. 3 shows a developed or "unrolled" view of the outer surface of the dielectric cylinder 11, with a modified form of outer conductive coating, having two portions 36 and 37, side by side. Each conductive portion 36 and 37 is formed with varying transverse width, designed to provide a desired law of variation of capacitance with respect to advance of the inner conductive plunger 20 or 40, not shown in Fig. 3, but the same as in Fig. 1 or 2.

The two coatings 36, 37, therefore provide two separate capacitances with respect to a common plate formed by the plunger structure, which is conveniently grounded when desired, by grounding shaft 13, as through panel 14 or is left ungrounded.

Figure 4A:
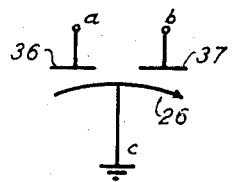
Figures 4A and 4B show equivalent circuits of the devices of Figures 1 and 2.
Figure 4B:
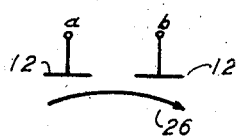

Figs. 4A and 4B show two circuit arrangements for this structure. Thus, in Fig. 4A, two separate capacitances are provided, between terminals a—c and b—c, respectively, terminal c being ground. In Fig. 4B, a single capacitance is provided between terminals a—b, the mercury plunger being unconnected. This latter form avoids sliding electrical contacts which may be required in the form of Fig. 4A.

Various shaped coatings such as 36, 37 may be particularly advantageous for a ganged tuning capaictor for radio receivers. Thus, coating 36 with the mercury plunger 20 or 40 may form the local oscillator circuit tuning capacitor, and the coating 37 with the plunger similarly forms the antenna circuit tuning capacitor, the two capacitances being designed to differ at each position of the mercury plunger by exactly the value required to make the local oscillator frequency differ from the antenna circuit frequency by an amount equal to the intermediate frequency.

This invention is particularly adapted to simple and uniform manufatcuring procedures such as set out in my copending application Serial No. 354,759, entitled "Machine for Automatically Testing and Adjusting the Values of Printed Circuit Resistors or Capacitors," filed May 13, 1953, and my copending application, Serial No. 376,180, for "Method of Making Variable Capacitors," filed August 20, 1953, by which the coatings whose dimensions determine the capacitance and its law of variation, are reshaped by abrading, so that at each position of the plunger the proper individual capacitances and capacitance difference is maintained, and any anomalies in manufactured dimensions are corrected for.

Multiple ganging of two or more capacitances may of course be accomplished in the same manner, the separation between coatings, either axial or circumferential, being merely adequate to reduce stray capacitance below necessary limits. For each capacitance, by suitable choice of shape of coating, any desired manner of variation of capacitance can be obtained.

In one practical form of gang tuning condenser for the radio broadcast range, the tuning capacitor was ¼ inch in diameter and 1½ inches long. The capacitor element coating was ¾ inch long, and the plunger was ½ inch long. The dielectric cylinder had a wall thickness of .015 and had a dielectric constant of about 300, providing a maximum capacitance of about 350 micromicrofarads. The ratio of maximum to minimum capacitance was several hundred. This latter factor is of great importance and offers an extraordinary advantage for such capacitors, permitting extremely wide band coverages compared to prior art constructions having such ratios of between 50 and 60. Still higher ratios may be obtained if desired.

It will be understood that all metallic elements of the device which may have contact with the mercury are preferably made of materials which will not amalgamate or chemically react with mercury; for example, they may be formed of or plated with platinum, rhodium, or other relatively inert metal. Similarly, the non-conductive materials used are selected to be relatively unaffected by the mercury.

While the use of mercury is particularly advantageous, since its high surface tension prevents the possibility of leakage through the seals 23, 24, which might be characteristic of other liquids having lower surface tension so as to wet the wall of the dielectric tube and the seals 23, 24, other conductive liquids may be used where desired.

Further sealing may be effected as well as lubrication by impregnation of the dielectric tube 11 or lubrication of its surface, by means of Silicone fluid or grease, greatly reducing friction of the sliding member. The extreme thinness of the lubricating film does not affect the operation of the unit.

The present invention is in no sense limited to the particular form of axial-motion-providing means illustrated, since any suitable or desired mechanism for producing controllable translatory movement of the mercury electrode within the dielectric cylinder 11 may be utilized wherever desired. While in the above illustration the dielectric cylinder 11 is assumed to be of circular cross-section, any desired uniform cross-section may also be utilized.

It is to be understood that the above illustration is intended to be illustrative only, and is not to be taken in a limiting sense, the scope of the present invention being defined solely by the appended claims.

What is claimed is:

1. A variable capacitance device comprising a hollow cylinder of dielectric material having a substantial dielectric constant of a value equal to several hundred, a silver coating on the exterior of said cylinder forming a first capacitor element, a slidable conductive plunger structure within said cylinder forming a second element of said capacitor device, said conductive plunger structure comprising a conductive rod mounted coaxially within said cylinder, a first conductive end wall within said cylinder and coupled to said rod, a first seal between said end wall and the interior surface of said dielectric cylinder for providing a slidable liquid-tight joint therebetween, a second conductive end wall within said cylinder, a second seal between said second end wall and the interior surface of said dielectric cylinder for providing a slidable liquid-tight joint therebetween, a hollow conductive tube between and connecting said end walls and having an apertured side wall, said second end wall having a threaded opening communicating with said connecting tube, a threaded plug device threadedly engaging said opening and comprising a plunger slidably engaging said connecting tube and a compression spring urging said plunger inwardly of said tube, and a body of liquid mercury substantially entirely filling the space bounded by said end walls and said dielectric cylinder, and means for adjusting the position of said rod to vary the area of overlap of said coating and said plunger structure to adjust the capacitance of said device, said coating having a peripheral dimension varying along the axis of said cylinder to provide a predetermined law of variation of capacitance as a function of displacement of said plunger structure.

2. A variable capacitance device comprising a hollow cylinder of dielectric material having a substantial dielectric constant of a value equal to several hundred, a silver coating on the exterior of said cylinder forming a first capacitor element, a slidable conductive plunger structure within said cylinder forming a second element of said capacitor device, said conductive plunger structure comprising a conductive rod mounted coaxially within said cylinder, a first conductive end wall within said cylinder and coupled to said rod, a first seal between said end wall and the interior surface of said dielectric cylinder for providing a slidable liquid-tight joint therebetween, a second conductive end wall within said cylinder, a second seal between said second end wall and the interior surface of said dielectric cylinder for providing a slidable liquid-tight joint therebetween, a hollow conductive tube between and connecting said end walls and having an apertured side wall, said second end wall having a threaded opening communicating with said connecting tube, a threaded plug device threadedly engaging said opening and comprising a plunger slidably engaging said connecting tube and a compression spring urging said plunger inwardly of said tube, and a body of liquid mercury substantially entirely filling the space bounded by said end walls and said dielectric cylinder, and means for adjusting the position of said rod to vary the area of overlap of said coating and said plunger structure to adjust the capacitance of said device.

3. A variable capacitance device comprising a hollow cylinder of dielectric material having a substantial dielectric constant of a value equal to several hundred, a conductive coating on the exterior of said cylinder forming a first capacitor element, a slidable conductive plunger structure within said cylinder forming a second element of said capacitor device, said conductive plunger structure comprising a conductive rod mounted coaxially within said cylinder, a first conductive end wall within said cylinder and coupled to said rod, a first seal between said end wall and the interior surface of said dielectric cylinder for providing a slidable liquid-tight joint therebetween, a second conductive end wall within said cylinder, a second seal between said second end wall and the interior surface of said dielectric cylinder for providing a slidable liquid-tight joint therebetween, connecting means having a cross-sectional area less than the area of each of said walls for securing said second end wall spaced from said first end wall and movable together therewith, and a conductive liquid substantially entirely filling the space bounded by said end walls and said dielectric cylinder, and means for adjusting the position of said rod to vary the area of overlap of said coating and said plunger structure to adjust the capacitance of said device.

4. A variable capacitance device comprising a hollow cylinder of dielectric material having a substantial dielectric constant of a value equal to several hundred, a conductive coating on the exterior of said cylinder forming a first capacitor element, a slidable conductive plunger structure within said cylinder forming a second element of said capacitor device, said conductive plunger structure comprising a first conductive end wall within said cylinder, a second conductive end wall within said cylinder, conecting means having a cross-sectional area less than the area of each of said walls for securing said second end wall spaced from said first end wall and movable together therewith, means for forming a slidable liquid-tight seal between each said wall and said cylinder and a conductive liquid substantially entirely filling the space bounded by said end walls and said dielectric cylinder and means for adjusting the position of said plunger structure to vary the area of overlap of said coating and said plunger structure to adjust the capacitance of said device.

5. A variable capacitor comprising a hollow cylinder of dielectric material having a substantial dielectric constant, a silver coating on the exterior of said cylinder, a conductive shaft mounted coaxially within said cylinder, a first conductive end wall coupled to said shaft, a first seal between said end wall and the interior surface of said dielectric cylinder for providing a slidable liquid-tight joint therebetween, a second conductive end wall, a second seal between said second end wall and the interior surface of said dielectric cylinder for providing a slidable liquid-tight joint therebetween, a hollow tube connecting said end walls and having an apertured side wall, said second end wall having a filler opening communicating with said latter tube, a filler plug closing said filler opening and a filling of mercury substantially entirely filling the volume bounded by said end walls and said dielectric tube and means for adjusting the position of said shaft to vary the area of overlap of said outer electrode and said mercury filling to adjust the capacitance of said device.

6. A variable capacitance device comprising a hollow cylinder of dielectric material having a substantial dielectric constant of a value equal to several hundred, a plurality of conductive coatings on the exterior of said cylinder, said coatings being in side-by-side relationship around the periphery of a transverse cross-section of said cylinder, a slidable conductive plunger structure within said cylinder, said conductive plunger structure comprising a conductive rod mounted coaxially within said cylinder, a first conductive end wall within said cylinder and coupled to said rod, a first seal between said end wall and the interior surface of said dielectric cylinder for providing a slidable liquid-tight joint therebetween, a second conductive end wall within said cylinder, a second seal between said second end wall and the interior surface of said dielectric cylinder for providing a slidable liquid-tight joint therebetween, a hollow conductive tube between and connecting said end walls and having an apertured side wall, said second end wall having a threaded opening communicating with said connecting tube, a threaded plug device threadedly engaging said opening and comprising a plunger slidably engaging said connecting tube and a compression spring urging said plunger inwardly of said tube, and a body of liquid mercury substantially entirely filling the space bounded by said end walls and said dielectric cylinder, and means for adjusting the position of said rod to vary the area of overlap of said coatings and said plunger structure, whereby movement of said conductive plunger structure simultaneously varies the capacitances between it and the several coatings, said coatings having dimensions along the transverse periphery of said cylinder independently varying along the axis of said cylinder to provide respective predetermined laws of variation of capacitance as a function of displacement of said plunger structure.

7. A variable capacitance device comprising a hollow cylinder of dielectric material having a substantial dielectric constant of a value equal to several hundred, a plurality of conductive coatings on the exterior of said cylinder, said coatings being in side-by-side relationship around the periphery of a transverse cross section of said cylinder, a slidable conductive plunger structure within said cylinder, said conductive plunger structure comprising a conductive rod mounted coaxially within said cylinder, a first conductive end wall within said cylinder and coupled to said rod, a first seal between said end wall and the interior surface of said dielectric cylinder for providing a slidable liquid-tight joint therebetween, a second conductive end wall within said cylinder, a second seal between said second end wall and the interior surface of said dielectric cylinder for providing a slidable liquid-tight joint therebetween, connecting means having a cross-sectional areas less than the area of each of said walls for securing said second end wall spaced from said first end wall and movable together therewith, and a conductive liquid substantially entirely filling the space bounded by said end walls and said dielectric cylinder, and means for adjusting the position of said rod to vary the area of overlap of said coatings and said plunger structure, whereby movement of said conductive plunger structure simultaneously varies the capacitances between it and the several coatings, said coatings having dimensions along the transverse periphery of said cylinder independently varying along the axis of said cylinder to provide respective predetermined laws of variation of capacitance as a function of displacement of said plunger structure.

8. A variable capacitance device comprising a hollow cylinder of dielectric material, a conductive coating on the exterior of said cylinder, a plunger within said cylinder having a pair of separated flanges of substantially the inner diameter of said cylinder, means for creating a slidable liquid-tight-seal between each said flange and said cylinder and a reduced-diameter portion between said flanges, a bore within said plunger, an aperture connecting said bore to the space between said flanges, a compressible solid material filling a portion of said bore, a conductive liquid in said space and aperture, and means for forcing said material toward said aperture to apply pressure to said liquid.

References Cited in the file of this patent

UNITED STATES PATENTS

| | | |
|---|---|---|
| 1,555,253 | Priess | Sept. 29, 1925 |
| 1,559,974 | Mulligan | Nov. 3, 1925 |
| 2,081,914 | Dow | June 1, 1937 |
| 2,597,341 | Kutchukian | May 20, 1952 |
| 2,607,826 | Barnes | Aug. 19, 1952 |

FOREIGN PATENTS

| | | |
|---|---|---|
| 648,583 | Great Britain | Jan. 10, 1951 |
| 649,316 | Great Britain | Jan. 24, 1951 |
| 1,056,401 | France | Oct. 21, 1953 |